Sept. 7, 1926.
F. C. NILSON
1,598,927
DRAFT KEY RETAINER
Filed March 5, 1925
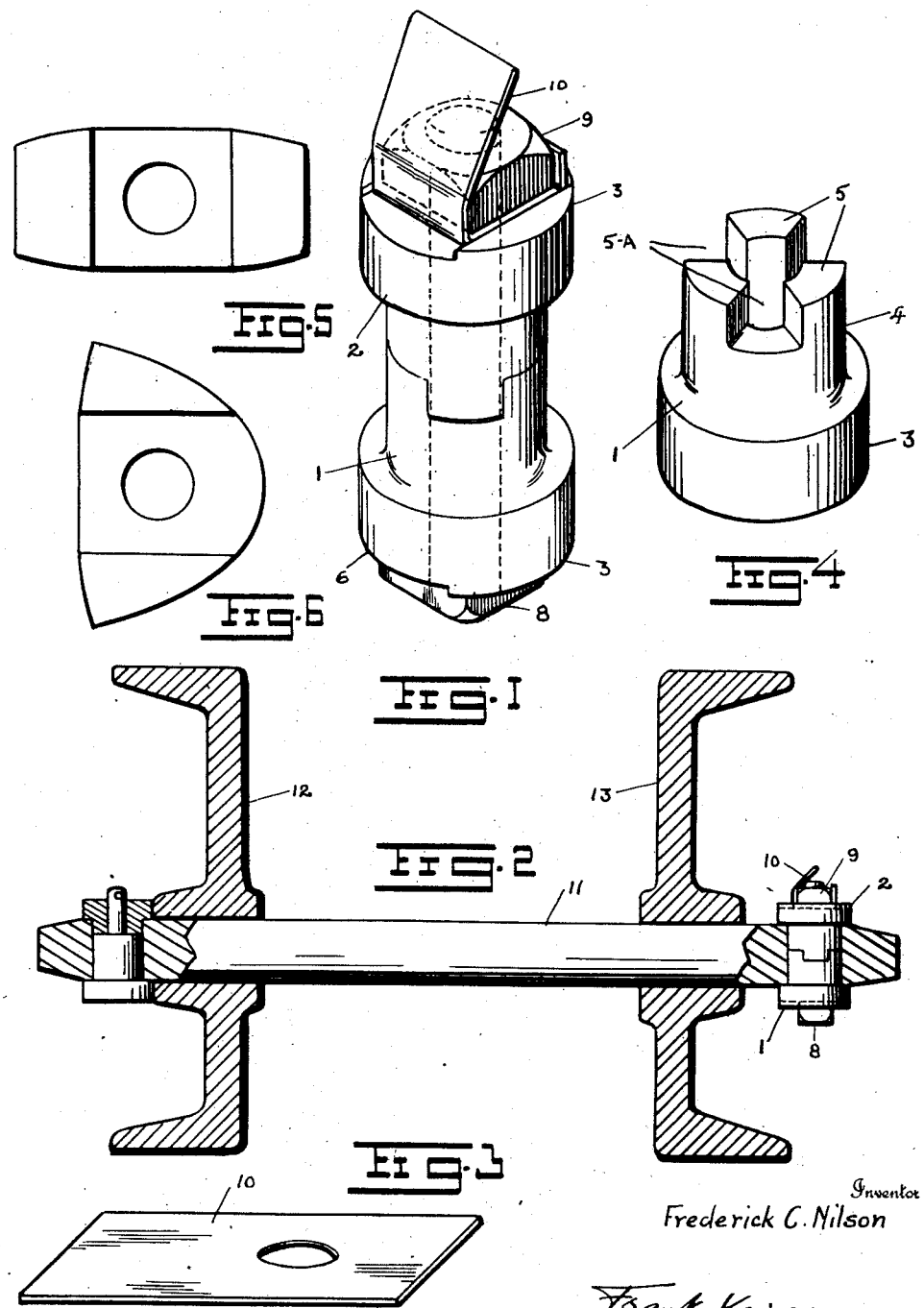
Inventor
Frederick C. Nilson
Frank Keiper
Attorney Patented Sept. 7, 1926.

1,598,927

UNITED STATES PATENT OFFICE.

FREDERICK C. NILSON, OF ROCHESTER, NEW YORK, ASSIGNOR OF ONE-HALF TO HOWARD T. CASEY, OF ROCHESTER, NEW YORK.

DRAFT-KEY RETAINER.

Application filed March 5, 1925. Serial No. 13,410.

The object of this invention is to provide a new and improved type of retainer for draft keys of railroad cars.

This and other objects of this invention will be fully illustrated in the drawing, described in the specification and pointed out in the claims at the end thereof.

In the accompanying drawing:—

Figure 1 is a detail perspective view of the retainer.

Figure 2 is a sectional view of the draft sills of a car showing a draft key in place between them with a pair of retainers provided in the key to prevent its disengagement from the draft sills.

Figure 3 is a detail perspective view of a locking washer for holding the nut of the retainer against rotation.

Figure 4 is a detail perspective view of one of the sections forming the retainer.

Figures 5 and 6 are top plan views of modified forms of the retainer having their heads or collars cut away on one or more sides to provide flat bearing surfaces thereon so that the heads of the retainer when resting against the side of the draft sills are prevented from rotating on the draft key.

In the several figures of the drawing like reference numerals indicate like parts.

The retainer forming the subject matter of my present invention is constructed in a manner that will provide a large bearing surface between the retainer and the draft key, materially increasing its strength over the old form of retainer. The retainer is also made so that it can be more easily inserted into the draft key and held securely locked in place therein.

As illustrated in the figures of the drawing the retainer comprises a spool built up of two sections 1 and 2. Each of these sections comprises a collar 3 that is formed on a shank 4 of reduced diameter with a central hole passing thru both the collar and the shank. The inner end of the shank of each section of the spool is notched to provide prongs 5 and recesses 5^A thereon. The prongs and recesses of the shanks of each section of the spool are identical so that the prongs of one section can engage into the recesses of the other section and vice versa as illustrated in Figures 1 and 2.

The top and bottom of the spool formed by the collars 3 has a shallow channel 6 formed therein to receive the head of the bolt 8 at one end of the spool and the lock washer 10 at the other end of the spool. The bolt 8 passes thru the central hole of the spool with a lock washer 10 placed on the under side of the nut 9. This lock washer as illustrated in Figure 3 comprises a strip of sheet metal having a hole suitably located therein. The width of the washer corresponds to the channel or groove provided in the heads of the spool and is adapted to nest therein when placed below the head or nut of the bolt.

After the bolt has been tightened, that is after the sections of the spool have been drawn together, the ends of the washer are bent up on one or both sides of the head or nut of the bolt as illustrated in Figure 1. The walls on the sides of the head or nut thus formed by the washer prevent the head or nut from turning on the spool.

As illustrated in Figure 2, two of the retainers are used to hold a draft key in place between the draft bars. For this purpose the draft key 11 is provided with a pair of holes one near each end of the key so as to locate them on the outside of the draft sills 12 and 13, at a predetermined distance from them. It must be understood that these draft keys must be given a certain amount of free lateral movement so that they can shift when necessary. The retainers are inserted by placing one half of the spool into the hole from the top and bottom of the draft key, and then passing the bolt 8 thru both of them to tie the two sections of the spool together with the teeth or prongs of one section engaging the grooves in the other section. This locks each section of the spool against rotation with relation to each other and locks the retainer in place in the hole in the draft key providing a collar or shoulder at the top and bottom of the draft key so that the draft key cannot slide out of the draft sills 12 and 13.

If it is desired to prevent the retainer from turning in the draft key the collars at the top and bottom thereof may be provided with one or more flat surfaces that can rest against the side of the draft sill and thus hold the head against rotation.

I claim:—

1. A retainer for draft keys comprising a shank, a collar at each end of said shank, one of said collars being formed integral with said shank and the other of said collars being separable from said shank, a bolt passing thru said shank and said collars for locking said separable collar to said shank and preventing its' rotation thereon, and means for locking said locking bolt against endwise movement and rotation relative to the shank.

2. A retainer for draft keys comprising a pair of collars, a shank at one side of each of said collars, prongs and grooves provided on the outer end of each of said shanks with the prongs of one shank engaging the grooves of the other shank to prevent their rotation with relation to each other, a locking bolt passing thru both of said collars and their shanks, means on one of said collars for locking said locking bolt against rotation in said collars and shanks, and means cooperating with the other of said collars for locking said bolt against endwise movement within said collars and their shanks.

3. A retainer for draft keys comprising a pair of collars, a hollow shank at one end of each of said collars, prongs and grooves provided in the end of each of said shanks adapted to engage one another, a tie bolt adapted to pass thru said collars and said hollow shanks to lock said shanks and said collars together and against rotation with relation to each other and means for holding said tie bolt against rotation within said hollow shank.

4. A retainer for draft keys comprising a pair of collars, a shank spacing and connecting said collars, an irregular division line in said shank dividing said shank into two sections, said shank and collars having a hole centrally thereof, a channel in the end of said collars, a bolt adapted to pass thru the central opening in said shank and collars, a nut threaded on said bolt, the head of said bolt being adapted to nest in the channel of one collar, a lock washer nested in the channel in the other collar below the nut of said bolt, said lock washer being adapted to prevent the rotation of said nut on said bolt.

5. A retainer for draft keys comprising a shank made up in two sections, a collar at the outer end of each of said sections, means for interlocking the inner ends of said shank sections, a bolt, a head at one end of said bolt, a nut threaded to the other end of said bolt, said bolt being adapted to pass thru both of said shank sections and hold them interlocked with each other, and means provided on the end of said collars to hold the bolt and nut against rotation relative to said retainer.

6. A retainer for draft keys comprising a pair of collars, a hollow shank on one side of each of said collars, prongs and grooves provided in the ends of said shanks adapted to engage one another, a tie bolt adapted to pass thru said collars and shanks, a head at one end of said tie bolt, a nut threaded to the other end of said tie bolt, said tie bolt being adapted to lock said shanks and collars together against rotation with one another, means for holding said head of said tie bolt against rotation on the outside of one of said collars, and means for holding said nut of said tie bolt against rotation on the outside of the other of said collars.

In testimony whereof I affix my signature.

FREDERICK C. NILSON.